March 12, 1957 C. F. SPANG ET AL 2,784,448
HAMBURG PATTY MAKING MACHINE
Filed Dec. 27, 1955 2 Sheets-Sheet 1
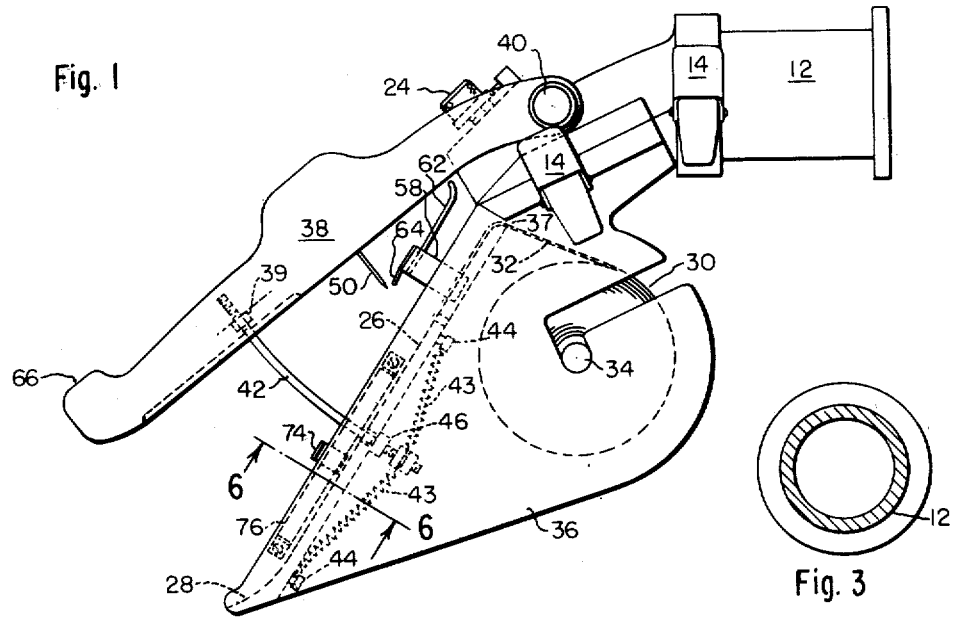
Fig. 1
Fig. 3
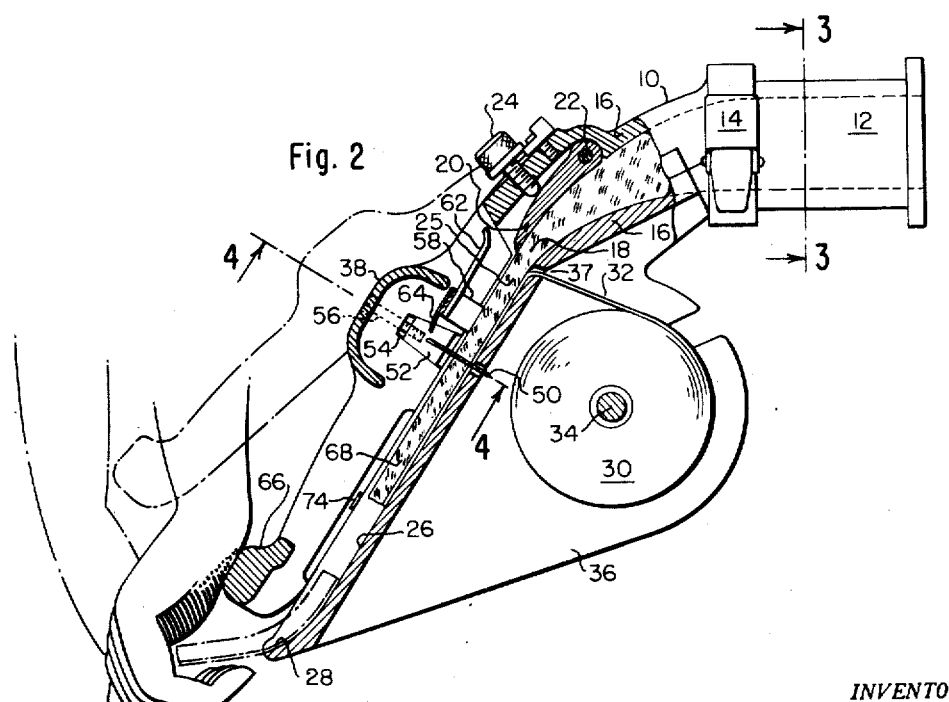
Fig. 2
INVENTORS
CARL F. SPANG
WESLEY E. LAZOTT
BY
Kenway, Jenney, Witter & Hildreth
ATTORNEYS March 12, 1957 C. F. SPANG ET AL 2,784,448
HAMBURG PATTY MAKING MACHINE
Filed Dec. 27, 1955 2 Sheets-Sheet 2

INVENTORS
CARL F. SPANG
WESLEY E. LAZOTT
BY
Kenway, Jenney, Witter & Hildreth
ATTORNEYS

United States Patent Office 2,784,448
Patented Mar. 12, 1957

2,784,448

HAMBURG PATTY MAKING MACHINE

Carl F. Spang, Wellesley, and Wesley E. Lazott, Hopkinton, Mass., assignors to Needham Manufacturing Company Inc., Needham Heights, Mass., a corporation of Massachusetts Application December 27, 1955, Serial No. 555,518

7 Claims. (Cl. 17—32)

This invention relates to hamburg patty making machines of the nature shown in copending application Serial No. 423,878, filed April 19, 1954, and more particularly to a novel hand controlled or operated machine adapted to be fed and operated by one man. The machine as illustrated in an attachment adapted to be applied to a meat grinder to receive the ground meat therefrom and extrude it in strip form, and the attachment includes a downwardly inclined tray together with a manually controlled or operated cut-off member for receiving the extruded product and rapidly cutting it into patties, the downward inclination of the tray serving rapidly to remove the patties by gravity as they are severed from the extruded strip. The primary object of the invention embodies a knife controlling or operating abutment member so located adjacent to the bottom end of the tray that one hand of the operator can effect each cutting off operation and catch the cut-off patty for stacking as it slides down and off the tray.

In a preferred and manually operated embodiment of the invention, a cut-off member carries a guillotine strip severing knife which severs a patty from the strip when the cut-off member is moved downwardly, and an important feature of the invention relates to an abutment carried by the cut-off member adjacent to the bottom end of the tray for engagement by a hand to move the member downwardly and wherein the hand remains in position to catch the cut-off patty as the member is released and moved upwardly. Such construction and arrangement permits a single operator to operate the cut-off member and catch and stack the patties with one hand while leaving his other hand free to feed meat into the grinder. The production of a novel and relatively simple hand operated machine of this nature and for the purpose described comprises a further object of the invention.

These and other features of the invention will be best understood and appreciated from the following description of a preferred embodiment thereof selected for purposes of illustration and shown in the accompanying drawings in which—

Figure 4:
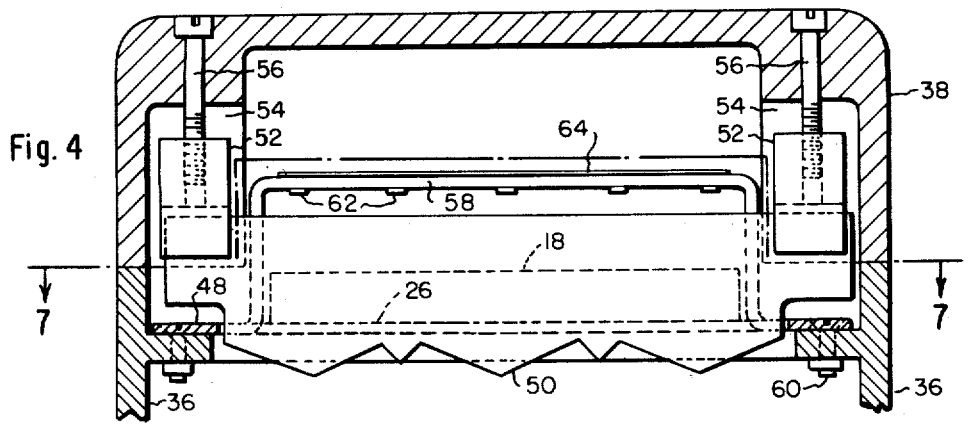
Figure 5:
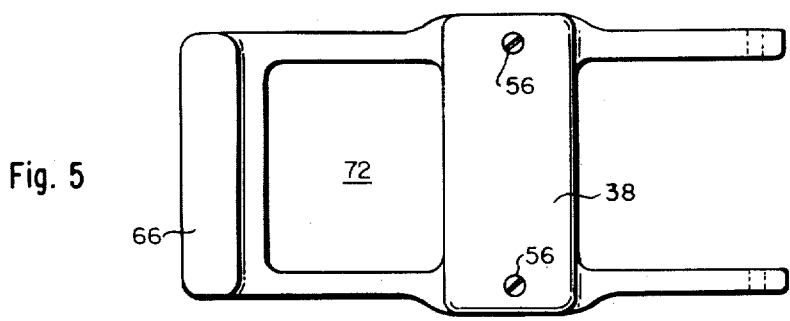
Figure 7:
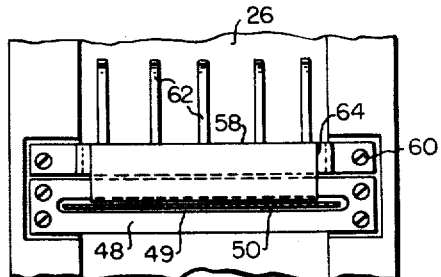
Figure 6:
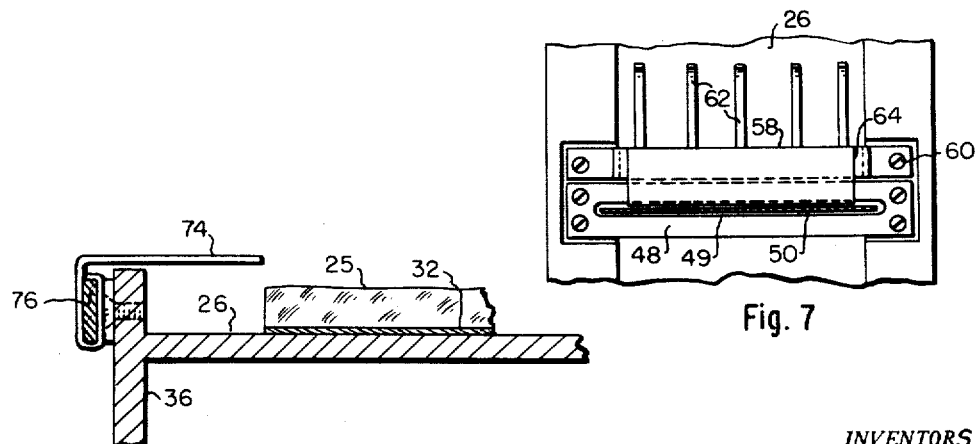

Fig. 1 is a side elevation of a machine embodying the invention in the form of an attachment to be applied to a meat grinder, Fig. 2 illustrates a vertical longitudinal section through the machine, Fig. 3 is a sectional view taken on line 3—3 of Fig. 2, Fig. 4 is an enlarged fragmentary sectional view taken on line 4—4 of Fig. 2, Fig. 5 is a plan view of the cut-off member, Fig. 6 is an enlarged fragmentary view taken on line 6—6 of Fig. 1, and Fig. 7 is a reduced fragmentary plan view taken on line 7—7 of Fig. 4.

As illustrated in Figs. 1 and 2 of the drawings, our hamburg patty making machine embodies an attachment 10 adapted to be applied to the delivery end of a meat grinding machine. In the drawings, 12 indicates an annular adaptor adapted to be applied to the delivery end of the grinding machine and 14 indicates quick release clamps for securing the attachment to the adaptor.

The meat extruding structure is similar to that disclosed in the said copending application and includes a chamber with walls 16 converging toward the delivery end which terminates in a wide and shallow rectangular slot 18. The outer portion of the upper wall 16 includes a gate 20 pivoted at 22. A member 24 threaded into the attachment housing engages the gate and provides a stop for limiting opening movement of the gate. Rotation of the member moves the stop axially and predetermines the position of the gate and the thickness of the extruded product.

The apparatus thus far described is adapted to extrude a ribbon-like strip 25 of ground meat outwardly beneath the gate 20. The upper end of a tray 26 is disposed beneath the slot 18 to receive the strip 25. The tray is inclined downwardly at a relatively steep angle to an outwardly curved bottom end 28. A roll 30 of paper 32 is mounted on a shaft 34 between brackets 36 and the paper is led from the roll through a slot 37 and downwardly on and along the inclined tray. The meat strip is extruded onto the paper and moves therewith down the tray. A cut-off member 38 is pivoted at its top end to the attachment at 40 and extends longitudinally of and above the tray 26 and is permitted a limited pivotal movement, illustrated in Fig. 2, toward and from the tray. A rod 42 fixed to one margin of the member 38 at 39 extends downwardly through the attachment and is engaged by the inner ends of two springs 43 having their outer ends fixed to the attachment at 44. The springs normally maintain the member in the raised position of Fig. 1 permitted by a stop 46. Mounted flush and transversely within the tray is a plate 48 slotted at 49 and a guillotine knife 50 carried by the member 38 is aligned with the slot in position to sever the meat and paper strips when the member is moved to the down position of Fig. 2.

Two blocks 52 are slotted to receive the ends of the knife 50 and each has opposed tapering sides fitting within a tapered recess 54 in the member 38. Screws 56 are provided in the member for threading into the blocks and drawing them tightly into the recesses. Such action compresses the blocks into tight holding contact with the knife.

Means are provided for stripping the meat from the knife upon upward movement of the member 38. This means comprises a bridge 58 disposed transversely over the tray and secured to the attachment at 60. Mounted on the bridge are fingers 62 extending rearwardly over the tray and a plate 64 having its forward margin disposed closely adjacent to the knife to strip the meat therefrom upon upward movement of the member 38.

The member 38 is provided with a hand engaging abutment 66 on its free end adjacent to the bottom end of the tray 26 for pivoting the member downwardly as illustrated in Fig. 2, such movement being adapted to sever a patty 68 from the extruded strip. This movement is a quick chopping motion effected by engagement of the base of the palm with the abutment 66 and, as illustrated in broken lines in Fig. 2, the operator immediately thereupon flexes the palm and arm backwardly to free the abutment but leaving the fingers in the position illustrated. The springs 43 thereupon immediately return the member 38 to its uppermost position and the severed patty 68 slides down the tray by gravity and is caught by the hand and stacked in the container 70. The other hand of the operator is left free to feed meat into the grinder.

The extruding of the meat strip is continuous and the operator observes movement of its forward end through an opening 72 in the cut-off member and operates the member when the strip has reached a predetermined position. This timing is facilitated by an index 74 disposed over the tray adjacent to one margin of the strip (Fig. 6). The index is mounted for frictional sliding movement on a bar 76 fixed to and extending longitudinally along one margin of the tray, thus permitting the lengthening or shortening of the patties. The operator quickly learns so to observe this timing relation as to produce patties of substantially uniform size.

The machine is relatively simple in construction and operation, employs some parts in common with the automatic means disclosed in said copending application, and provides novel mechanism for rapidly making hamburg patties at relatively small expense. The primary function of the machine is to provide for operating the patty cutting knife and catching the cut patty with one hand of the operator and, while we have herein illustrated the knife as manually operated by contact of the hand with the abutment 66, it will be understood that the knife could be power operated under the control of a hand engageable abutment in the form of a switch or like controlling member located adjacent to the bottom end of the tray 26. It will be noted that the abutment member 66 is normally inoperative as illustrated in Fig. 1 and when moved to the operative position illustrated in Fig. 2 effects the severing of a patty 68 from the strip 25.

Having thus disclosed our invention what we claim as new and desire to secure by Letters Patent is:

1. A one hand patty forming and stacking machine, comprising a housing having an extruding chamber therethrough including a delivery end adapted to extrude ground meat therefrom in the form of a flat strip of predetermined width, a strip receiving tray in alignment with the chamber and extending forwardly from said delivery end in position to receive and conduct the extruded strip forwardly along a predetermined path, a cut-off member mounted on the machine for pivotal movement about a horizontal axis extending transversely of the tray, said member being mounted for pivotal movement about said axis to and from a depressed position and a position raised therefrom and carrying a depressable abutment on its free end disposed in said depressed position adjacent to the free end of the tray, means normally pivoting the member to the raised position, and a severing element carried by said member transversely of the tray intermediately between said axis and abutment and adapted to sever a patty from the forward end of the strip when the member is moved to depressed position, the member being adapted to be depressed by contact of a hand with said abutment and being so disposed that the same hand can catch and stack the severed patty as it leaves said free end of the tray.

2. The machine defined in claim 1 in which said cut-off member is of U-shape embodying two relatively long legs disposed at opposite sides of and pivoted at their rear ends to the housing for movement about said axis, and bridging means integrally connecting the legs forwardly remote from said axis and carrying said severing element.

3. The machine defined in claim 2 in which said abutment is disposed forwardly of the severing element and integrally connects the legs.

4. The machine defined in claim 3 in which the cut-off member has an opening therethrough between the bridging means and the abutment permitting visible observation therethrough of the strip on the tray.

5. A one hand patty forming and stacking machine, comprising a housing having an extruding chamber therethrough including a delivery end adapted to extrude ground meat therefrom in the form of a flat strip of predetermined width, a strip receiving tray in alignment with the chamber and extending forwardly from said delivery end to an exit end and in position to receive and conduct the extruded meat forwardly along a predetermined path, a normally inoperative abutment member disposed at said exit end and manually movable to operative position, and means including a strip severing element disposed transversely across the tray intermediately between said delivery and exit ends and operative in response to movement of said member to operative position to sever a patty from the forward end of the strip, said member being adapted to be moved to operative position by pressure contact of a hand therewith and being disposed in its operative position so closely adjacent to said exit end of the tray that the same hand can catch and stack the severed patty as it leaves said exit end.

6. The machine defined in claim 5 plus a visible index guide on and adjustable longitudinally of the tray for indicating the cutting off position of the strip.

7. The machine defined in claim 5 in which said strip severing means comprises a cut-off member disposed over and above the tray and carrying said strip severing element and said abutment member, and means mounting the cut-off member for movement toward and from the tray.

References Cited in the file of this patent
UNITED STATES PATENTS

| | | |
|---|---|---|
| 1,651,378 | De Lucia et al. | Dec. 6, 1927 |
| 2,085,108 | Louisot et al. | June 29, 1937 |
| 2,539,232 | Dempster | Jan. 23, 1951 |
| 2,752,629 | Shadid | July 3, 1956 |